US006152256A

United States Patent [19]

Favret et al.

[11] Patent Number: 6,152,256

[45] Date of Patent: Nov. 28, 2000

[54] METHOD FOR CONTROLLING SEISMIC VIBRATOR GROUND FORCES

[75] Inventors: Paul Favret; Evan B. Genaud, both of Littleton, Colo.

[73] Assignee: Aspect Resources LLC, Denver, Colo.

[21] Appl. No.: 09/422,811

[22] Filed: Oct. 21, 1999

Related U.S. Application Data

[60] Provisional application No. 60/106,085, Oct. 29, 1998.

[51] Int. Cl.[7] .......... G01V 1/00

[52] U.S. Cl. .......... 181/111; 367/38

[58] Field of Search .......... 181/108, 111; 367/38, 40, 41, 189

[56] References Cited

U.S. PATENT DOCUMENTS 5,410,517 4/1995 Andersen .......... 181/108
5,822,269 10/1998 Allen .......... 181/111

*Primary Examiner*—Khanh Dang
*Attorney, Agent, or Firm*—Edwin H. Crabtree; Ramon L. Pizarro; Donald W. Margolis

[57] ABSTRACT

A method used for controlling vibrator ground force output from a seismic vibrator and reducing potential damage to nearby structures. The method may be applied to any type of seismic vibrator for controlling the amount of vibrator force output applied to a ground subsurface. The subject method controls the vibrator force output as a function of frequency to form a force variable sweep. Low frequency waves are harmful to structures. The force variable sweep reduces the percentage of harmful low frequency waves while imparting a great deal of energy. The method steps include first selecting and constructing a frequency dependent force function from either a hyperbolic tangent function mathematical equation or a simple step function mathematical equation. Second, implementing a seismic vibrator frequency control instrument with the selected frequency dependent force function. Third, applying the force function to either a seismic upsweep or a seismic downsweep. Fourth, generating 20 percent of a total force output in a frequency range of 2 to 50 Hz. The last step, increasing the output to 80 percent of the total force output in a frequency range of 50 to 100 Hz.

17 Claims, 1 Drawing Sheet

18 12 28 28 10 24 30 30 31 34 16 22 32 26 14 20

METHOD FOR CONTROLLING SEISMIC VIBRATOR GROUND FORCES

This application is based on a provisional application filed in the U.S. Patent and Trademark Office on Oct. 29, 1998, Ser. Number 60/106,085, title "METHOD FOR CONTROLLING SEISMIC VIBRATOR GROUND FORCE AS A FUNCTION OF SWEEP FREQUENCY" by the subject inventors.

BACKGROUND OF THE INVENTION (a) Field of the Invention

This invention relates to field of geophysical prospecting and more particularly, but not by way of limitation, to a method for generating a seismic vibrator sweep using frequency as a determinant for the vibrator force output applied to the subsurface of the earth.

(b) Discussion of Prior Art

In the oil and gas exploration industry, geophysical tools and techniques are commonly employed in order to delineate a subterranean structure for adequate hydrocarbon deposits. Many different techniques are used to generate a seismic signal.

In the early 1960's, seismic vibrators were developed and used in the field. A seismic vibrator is used as an energy source. A seismic vibrator in its simplest form is merely a heavy vehicle that has the ability to shake the ground at a predetermined range of frequencies. Normally in a range of 2 to 100 Hz. Using the seismic vibrator has the advantage of not being an impulsive energy source such as dynamite, which releases all of its energy at one time and can pose safety and environmental concerns. Instead, the vibrator imparts a signal into the subsurface of the earth over a longer period of time thus decreasing the energy level.

The imparted energy generated travels through the subsurface and reflects some of the energy from certain subsurface geological boundaries or layers. The reflected energy is then transmitted back to the earth's surface where it is recorded using an earth motion detector. The recorded data is processed to yield information about a location and physical properties of layers making up the location's subsurface.

The seismic vibrator generates a signal, also known as a sweep. The vibrator applies the sweep to the subsurface of the earth. Sweeps are sinusoidal vibrations and are typically in a range of 2 to 100 Hz. The vibrations last a duration of 2 to 20 seconds depending on the terrain, the subsurface lithology, economic constraints and physical capabilities of the vibrator. The sinusoidal sweep can be increased in frequency overtime, which is called an "upsweep". The upsweep is the signal used typically in modern seismic exploration. Also, the sinusoidal sweep can be decreased in frequency overtime, which is called a "downsweep". The end products of the vibrator sweep are waves that propagate through the earth to return clues about the subsurface.

Waves that are generated by a seismic vibrator can be classified into two categories. The first category contains high-frequency waves and normally in a range of 50 to 100 Hz. The higher frequency waves are responsible for much of the temporal resolution seen in the collected data. The second category includes the powerful low frequency waves that penetrate deep into the earth's surface. The low frequency waves are less than 50 Hz.

Both types of waves are collected to produce images of the subsurface that are then used to make predictions for the best drilling locations to tap hydrocarbon reserves.

The problem with the prior art seismic signals or constant force sweeps is the inability to separately manage the harmful low frequency signals from the less harmful higher frequency sweeps. An undesirable byproduct is to use a lower force throughout the entire sweep when conditions demand that the harmful low frequency waves be suppressed. The end result is a seismic energy source that has a continuously low force throughout its range of frequencies. The use of a continuously low force precludes the use of the vibrator's full energy potential for effective seismic exploration.

Therefore, a need exists for a method of separating low and high frequency force output or linking the force assimilated to the subsurface of the earth as a function of frequency. The subject invention as described herein provides such a method.

SUMMARY OF THE INVENTION

In view of the foregoing, it is a primary object of the subject invention to provide a method for decreasing a force output into the subsurface of the earth in a low frequency range of a vibrator sweep while preserving a force output into the earth for the higher frequency sweeps.

Another object of the invention is to provide a method of controlling the force output from a seismic vibrator into the subsurface of the earth while reducing the potential for damage to structures on the ground surface.

Still another object of the subject method is that any type of signal or sweep (linear or non-linear) may be controlled using a frequency dependent force function.

Yet another object of the invention is the method may be applied to any type of seismic vibrator for controlling the amount of vibrator force output applied to a ground subsurface.

Another object of the method is to control the vibrator force output as a function of frequency to form a force variable sweep. The force variable sweep reduces the percentage of harmful low frequency waves while imparting a great deal of energy.

The method steps include first selecting and constructing a frequency dependent force function from either a hyperbolic tangent function mathematical equation or a simple step function mathematical equation. Second, implementing a seismic vibrator frequency control instrument with the selected frequency dependent force function. Third, applying the force function to either a seismic upsweep or a seismic downsweep. Fourth, generating 20 percent of a total force output in a range of 2 to 50 Hz. The last step, increasing the output to 80 percent of the total force output in a range of 50 to 100 Hz.

These and other objects of the present invention will become apparent to those familiar with seismic vibrators and methods related to generating seismic vibrator sweeps when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
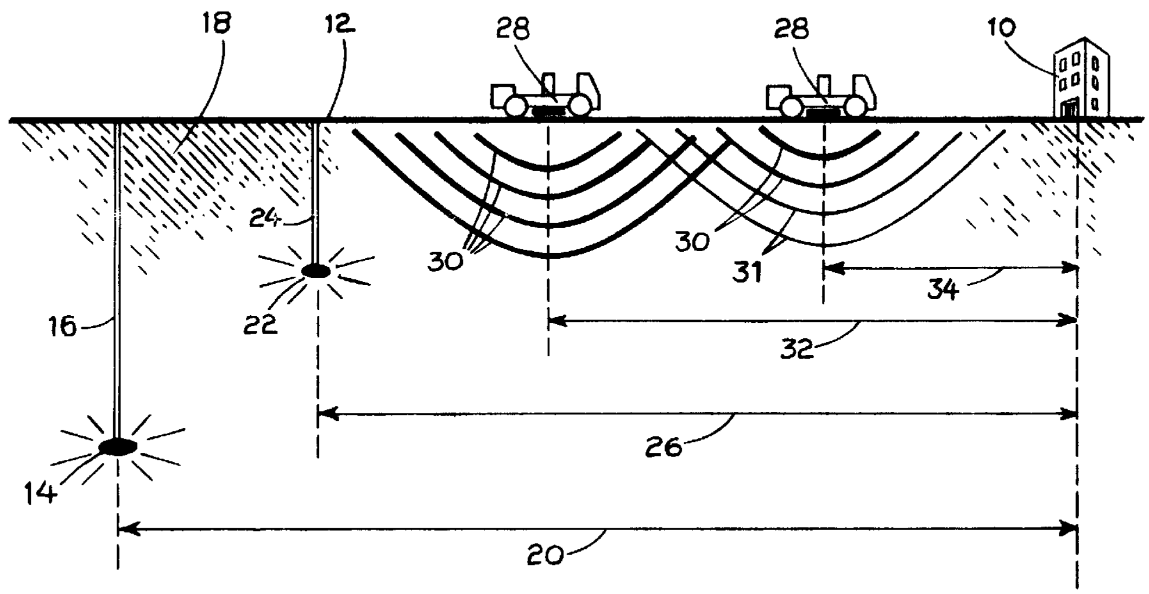
FIG. 1 is seismic wave source location diagram. The diagram illustrates a structure, such as a building, which may be affected and damaged by low frequency waves. Four seismic wave sources are shown in the drawing and their farthest distance from the structure to avoid potential damage to the building.

In FIG. 1, a seismic wave source location diagram is illustrated. In this diagram a structure 10 on a ground surface 12 is shown. The structure 10 may be a building, tower, pipeline, bridge, highway, canal and various other types of structures which may be affected and damaged by low frequency waves. Four seismic wave sources are shown in the drawing. The sources are placed at their farthest distance from the structure 10 to avoid potential damage.

The farthest source from the structure 10 is a normal dynamite charge 14. A normal dynamite charge will vary depending on the location. A typical charge might be 5.5 pounds of quick burning dynamite. For example, the charge 14 can be placed 100 feet below the ground surface 12 in the bottom of a drill hole 16 in a subsurface 18. This is the strongest charge applied to the subsurface 18 and therefore must be placed the farthest distance from the structure 10. The farthest distance is shown as arrow 20.

The next farthest source is a smaller dynamite charge 22 buried in the bottom of a shallower depth drill hole 24 in the subsurface 18. Because the charge 22 is smaller, it can be located at a closer distance, indicated by arrow 26, to the structure 10.

A third farthest source is a seismic vibrator 28 which imparts constant output of seismic waves 30 at high and lower frequencies into the subsurface 18 using a standard vibrator sweep. The waves 30 are shown as dark thick lines. The vibrator 28 can be located closer to the structure 10 because it spreads its energy over a longer time period. The time period is important, since it is a goal to impart the same amount of energy into the subsurface 18. For example, dynamite will typically release all of its energy in less than 0.4 seconds. A seismic vibrator places the same amount of energy into the ground over a 12 second period. Therefore, the vibrator 28 does not cause as much damage when compared to a dynamite charge and can be placed at a closer distance, indicated by arrow 32, to the structure 10.

The closest energy source to the structure 10 is another seismic vibrator 28 using the subject method described herein. The vibrator 28 can be placed at the shortest distance, indicated by arrow 34, to the structure 10 because the vibrator 28 has been programmed to de-emphasize low frequency waves indicated by thinner waves 31 when compared to the normal waves 30 shown as thicker waves in this drawing. As mentioned above, low frequency waves are harmful to structures. By using the subject invention with less low frequency wave force output, the seismic vibrator 28 can operate successful in exploring subsurface geology closer to various types of building structures without the potential of structural damage.

Figure 2:
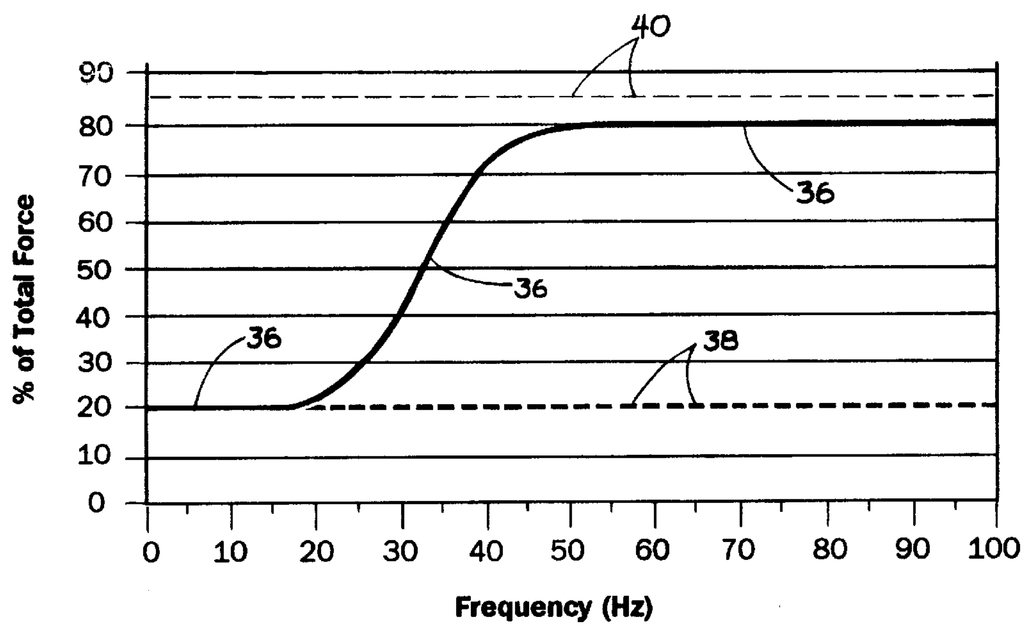
FIG. 2 depicts a vibrator generated sweep graph from 2 to 100 Hz measured against percent of the total vibrator ground force output. The graph illustrates the use of the subject method to control selected low frequency sweep as a percent of the total force compared to two constant force sweeps without the ability to separately manage the harmful low frequency signals.

In FIG. 2, a vibrator generated sweep graph from 2 to 100 Hz is shown and measured against from 0 to 90 percent of a total vibrator ground force output imparted into the subsurface 18. The graph illustrates the subject method to control selected low frequency sweep as a percent of the total force. The force variable sweep is shown as a solid line 36. The force variable sweep line 36 is compared to a constant force sweep without the ability to separately manage the harmful low frequency signals. The low constant force sweep is shown as dashed line 38 which operates at 20 percent of the total force. Another high constant force sweep is shown as dashed line 40. The high constant force sweep 40 operates at 85 percent of the total force.

The method for controlling vibrator ground force output starts with first selecting and constructing a frequency dependent force function from either a hyperbolic tangent function mathematical equation or a simple step function mathematical equation. Once the frequency dependent force function is determine, the new force function is implemented into frequency control instrument software and hardware which operate the vibrator 28 and it's ground force output. The force function is then applied to either a seismic wave upsweep or a seismic wave downsweep from the vibrator 28.

In FIG. 2, an example of the subject method is shown as solid line 36 wherein the initial 20 percent of the total force output of the low frequency waves is in a range of 2 to 20 Hz. It should be kept in mind that the initial percent of the total force output of the low frequency waves can vary, 0 to 90 percent at 2 to 50 Hz, depending on the seismic location and the nearest of structures that might be damaged. In this example, the percent of total force is then increased in a range of 20 to 45 Hz. The total force output then remains constant from 45 to 100 Hz.

When using the prior art low constant force sweep shown as dashed line 38, the force output operates at 20 percent of the total force. By reducing the output to 20 percent, obviously potential damage to nearby structures is greatly reduced, but in Turn the force output is ineffective in obtaining a clear picture of the ground subsurface for oil and gas exploration. The high constant force sweep shown as dashed line 40 operates at 85 percent of the total force. The high constant force sweep 40 will give a clear picture of the subsurface geology, but with the output operating at 85 percent of the total force, the potential for damage to nearby structures is great.

The following are two examples of the mathematical equations used in selecting and constructing the frequency dependent force function. They are:

Hyperbolic Tangent Function EQUATION 1

$$\%TF = \frac{\left[\frac{TFR}{2} \times \text{Factor}\right] \times \left[\text{HyperbolicTangent}\left(f \times \frac{2\pi}{DRR \times \text{Factor}} - CFR \times \frac{2\pi}{DRR}\right) + MTF \times \text{Factor}\right]}{\text{Factor}}$$

-continued

| | |
|---|---|
| $\%TF$ | Percentage of Total Force applied to earth |
| | Factor Scale Transformation $= 100$ |
| $CFR$ | Center Frequency of Ramp |
| $LTF$ | Lower bound as a percentage of Total Force |
| $UTF$ | Upper bound as a percentage of Total Force |
| $MTF$ | Median of bounded Total Force $= (UTF - LTF)/2 + LTF$ |
| $TFR$ | Total Force Range $= UTF - LTF$ |
| $DRR$ | Desired Range of Ramp |

Step Function EQUATION 2

$$\%TF = \begin{cases} LTF\text{, when freq. is less than the beginning ramp freq., } f < (CFR - DRR/2) \\ LTF\text{ linear to }UTF\text{, when freq. is within the desired ramp freq., } f\text{ within }(CFR + / - DRR/2) \\ UTF\text{, when freq. is greater than the ending ramp freq., } f > (CFR + DRR/2) \end{cases}$$

| | |
|---|---|
| $\%TF$ | Percentage of Total Force applied to earth |
| | Factor Scale Transformation $= 100$ |
| $CFR$ | Center Frequency of Ramp |
| $LTF$ | Lower bound as a percentage of Total Force |
| $UTF$ | Upper bound as a percentage of Total Force |
| $MTF$ | Median of bounded Total Force $= (UTF - LTF)/2 + LTF$ |
| $TFR$ | Total Force Range $= UTF - LTF$ |
| $DRR$ | Desired Range of Ramp |

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A method used for controlling vibrator ground force output from a seismic vibrator and reducing potential damage to nearby structures, the method controls the vibrator force output from the vibrator as a function of frequency to form a force variable sweep, the steps comprising:

selecting and constructing a frequency dependent force function from a known mathematical equation;

implementing a seismic vibrator frequency control instrument of the vibrator with the selected frequency dependent force function;

applying the force function to a vibrator's seismic sweep output;

generating an output of less than 50 percent of a total force output in a frequency range of 2 to 50 Hz; and increasing the output in a range 50 to 90 percent of the total force output in a frequency range of 50 to 100 Hz.

2. The method as described in claim 1 wherein the step of applying the force function to the vibrator's seismic sweep output is applied to the vibrator's seismic upsweep output.

3. The method as described in claim 1 wherein the step of applying the force function to the vibrator's seismic sweep output is applied to the vibrator's seismic downsweep output.

4. The method as described in claim 1 wherein the step of generating an output is in a range of 20 to 50 percent of a total force output and in a frequency range of 2 to 50 Hz.

5. The method as described in claim 1 wherein the step of increasing the output is in a range of 70 to 90 percent of the total force output in a frequency range of 50 to 100 Hz.

6. The method as described in claim 1 wherein the step of selecting and constructing a frequency dependent force function is based on a hyperbolic tangent function mathematical equation.

7. The method as described in claim 1 wherein the step of selecting and constructing a frequency dependent force function is based on a step function mathematical equation.

8. A method used for controlling vibrator ground force output from a seismic vibrator and reducing potential damage to nearby structures, the method controls the vibrator force output from the vibrator as a function of frequency to form a force variable sweep, the steps comprising:

selecting and constructing a frequency dependent force function from a known mathematical equation;

implementing a seismic vibrator frequency control instrument of the vibrator with the selected frequency dependent force function;

applying the force function to a vibrator's seismic downsweep output;

generating an output of less than 40 percent of a total force output in a frequency range of 2 to 50 Hz; and increasing the output to 90 percent of the total force output in a frequency range of 50 to 100 Hz.

9. The method as described in claim 8 wherein the step of generating an output is in a range of 20 to 40 percent of a total force output and in a frequency range of 2 to 50 Hz.

10. The method as described in claim 8 wherein the step of increasing the output is in a range of 70 to 90 percent of the total force output in a frequency range of 50 to 100 Hz.

11. The method as described in claim 8 wherein the step of selecting and constructing a frequency dependent force function is based on a hyperbolic tangent function mathematical equation.

12. The method as described in claim 8 wherein the step of selecting and constructing a frequency dependent force function is based on a step function mathematical equation.

13. A method used for controlling vibrator ground force output from a seismic vibrator and reducing potential damage to nearby structures, the method controls the vibrator force output from the vibrator as a function of frequency to form a force variable sweep, the steps comprising:

selecting and constructing a frequency dependent force function from a known mathematical equation;

implementing a seismic vibrator frequency control instrument of the vibrator with the selected frequency dependent force function;

applying the force function to a vibrator's seismic upsweep output;

generating an output of less than 40 percent of a total force output in a frequency range of 2 to 50 Hz; and increasing the output to 90 percent of the total force output in a frequency range of 50 to 100 Hz.

14. The method as described in claim 13 wherein the step of generating an output is in a range of 20 to 40 percent of a total force output and in a frequency range of 2 to 50 Hz.

15. The method as described in claim 13 wherein the step of increasing the output is in a range of 70 to 90 percent of the total force output in a frequency range of 50 to 100 Hz.

16. The method as described in claim 13 wherein the step of selecting and constructing a frequency dependent force function is based on a hyperbolic tangent function mathematical equation.

17. The method as described in claim 13 wherein the step of selecting and constructing a frequency dependent force function is based on a step function mathematical equation.

* * * * *